INVENTORS
GUSTAV A. KUECHENMEISTER
GEORGE F. WIKLE
ELWOOD A. STIEGLER
BY *James J. Long*
AGENT

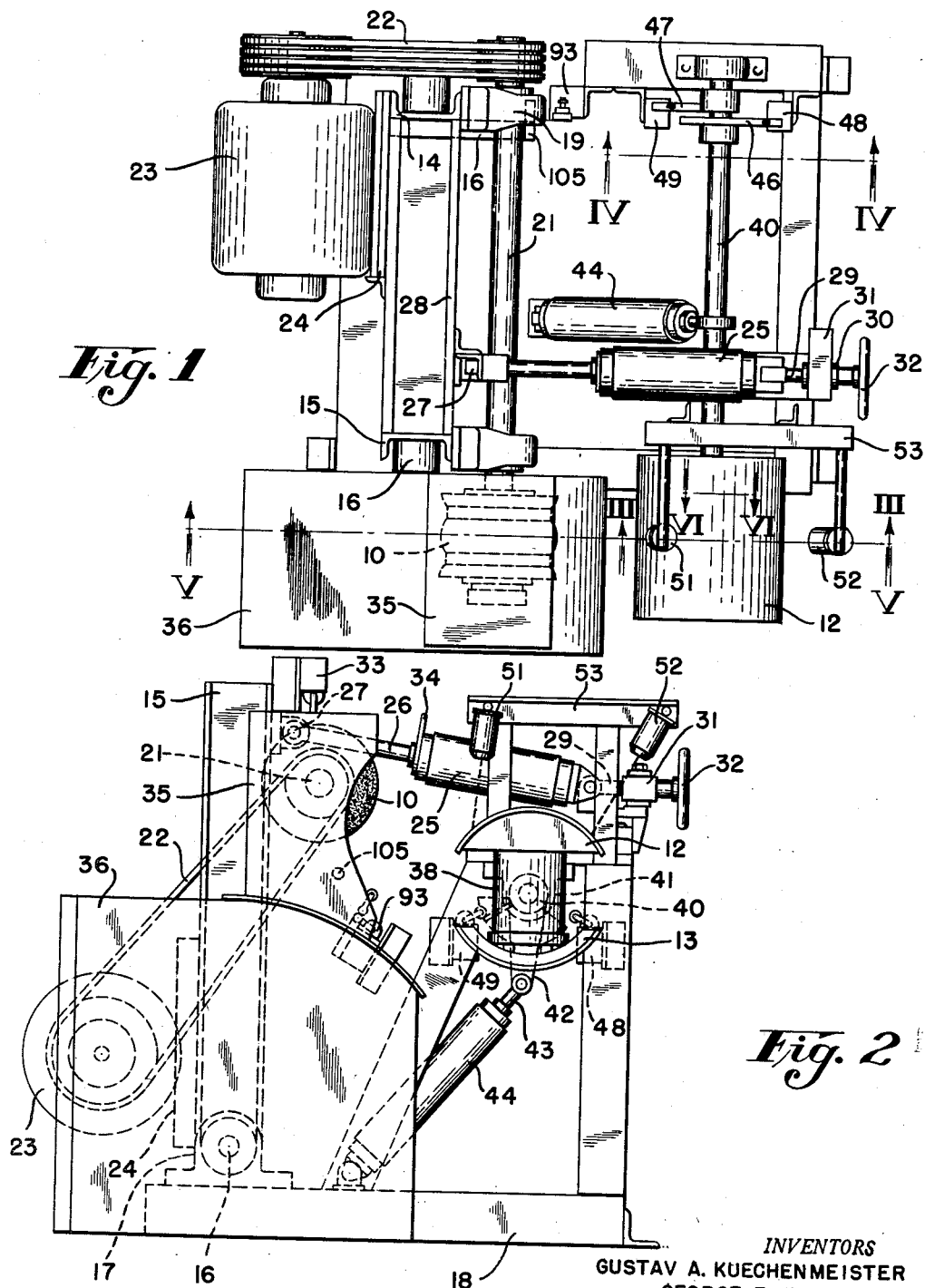

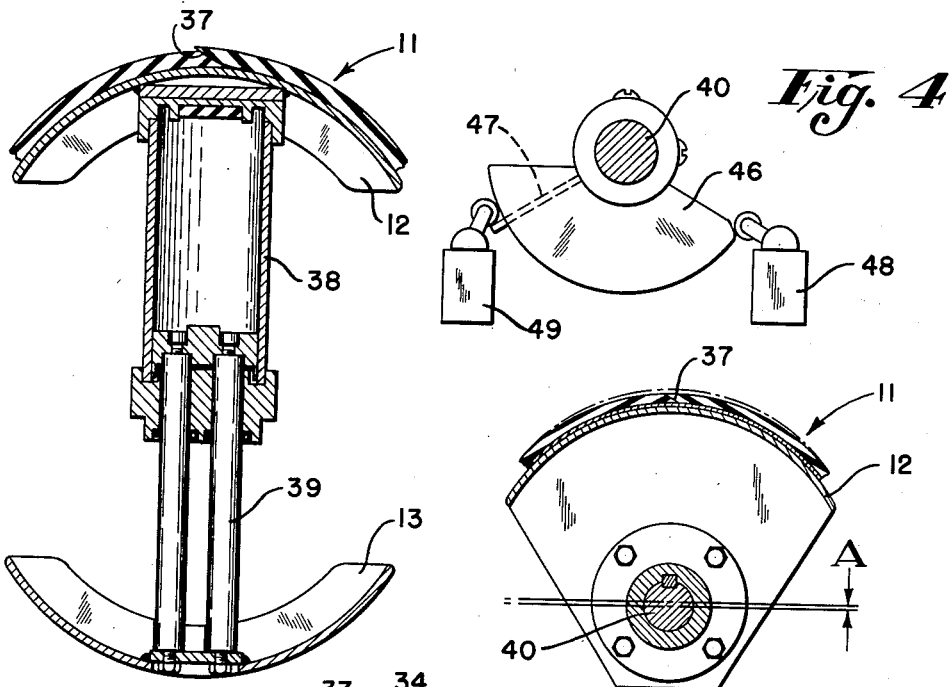
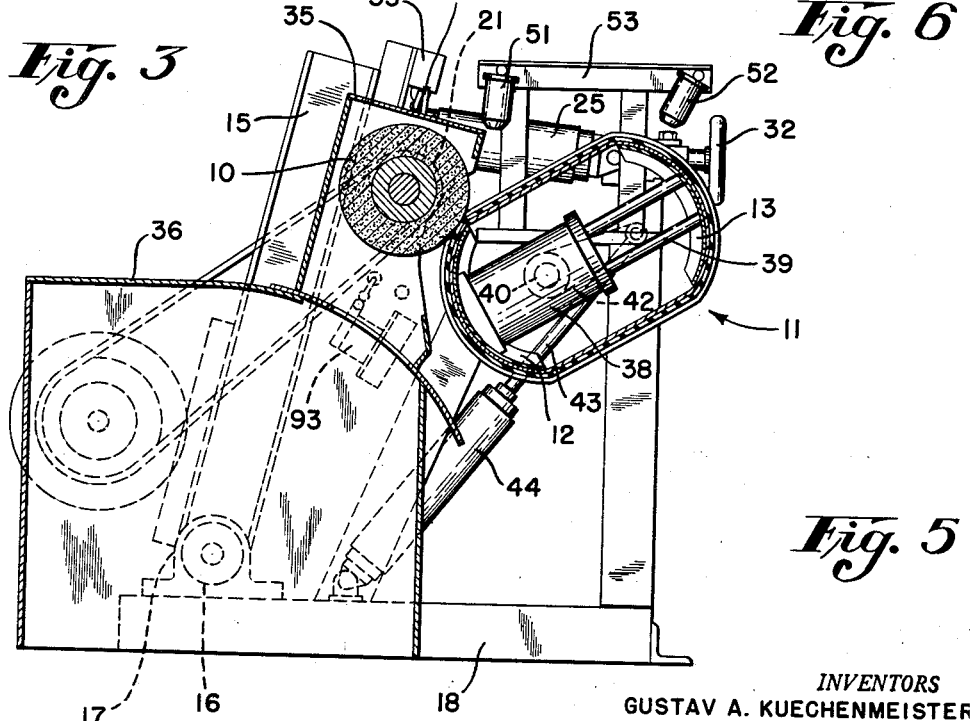
INVENTORS
GUSTAV A. KUECHENMEISTER
GEORGE F. WIKLE
ELWOOD A. STIEGLER
BY James J. Long
AGENT

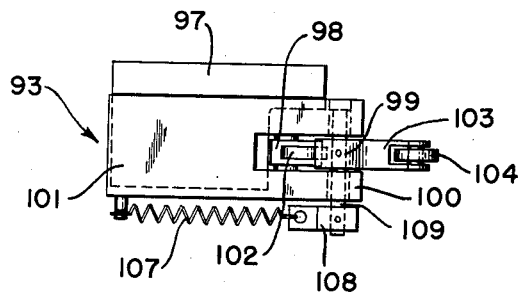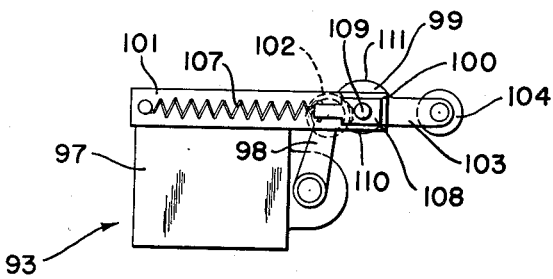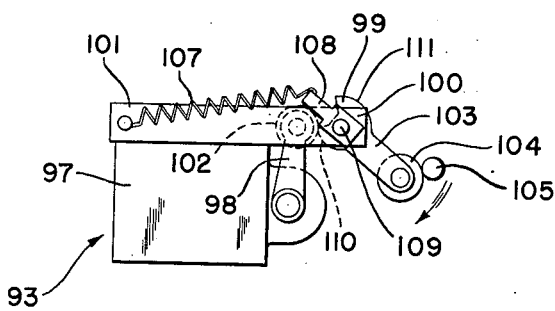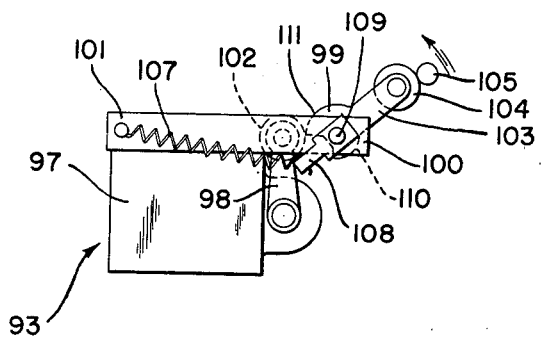

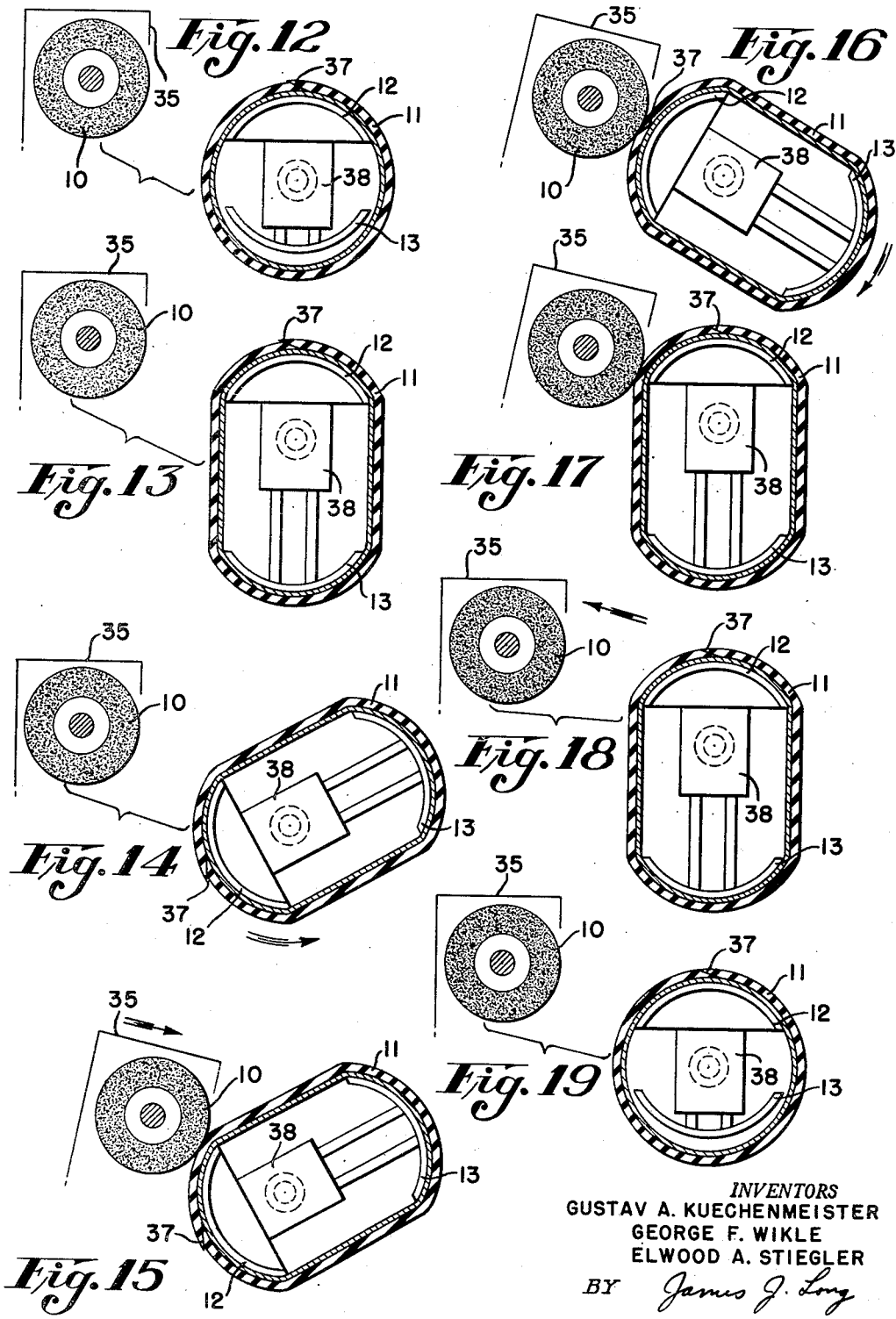

INVENTORS
GUSTAV A. KUECHENMEISTER
GEORGE F. WIKLE
ELWOOD A. STIEGLER

Patented May 18, 1954

2,678,678

UNITED STATES PATENT OFFICE 2,678,678

METHOD AND APPARATUS FOR MAKING UNIFORM TIRE TREADS

Gustav A. Kuechenmeister, Grosse Pointe Woods, George F. Wikle, Detroit, and Elwood A. Stiegler, Grosse Pointe Park, Mich., assignors to United States Rubber Company, New York, N. Y., a corporation of New Jersey Application February 4, 1952, Serial No. 269,716

16 Claims. (Cl. 154—9)

This invention relates to a method and apparatus for making uniform tire treads, and more particularly it is directed to the production of pneumatic tires characterized by more uniform deflection characteristics, with consequent relative freedom from vibration in service.

Pneumatic tires made in the conventional manner sometimes exhibit in use an undesirable characteristic known as "thump," which is a vibration and noise arising largely from the fact that the deflection characteristics of the tire are not sufficiently uniform throughout the circumference of the tire. Such thumping is particularly objectionable in modern automobiles which are designed to run with exceptional quietness and smoothness even at relatively high speeds. It has been found that the non-uniform deflection characteristics of the tire which are responsible for thumping are generally due principally to irregularities which arise in the course of the conventional operations of forming the tread and applying it to the tire carcass.

It is therefore a principal object of the present invention to provide an improved method of manufacturing tires which results in more uniform deflection characteristics in the tire, with consequent reduction of thumping.

Another object is the provision of an apparatus for improving the uniformity of tire treads.

The manner in which the invention accomplishes the foregoing objects, as well as additional objects and advantages, will be made manifest in the following detailed description, which is intended to be read with reference to the accompanying drawings, wherein:

Fig. 1 is a plan view, with parts broken away, of a machine constructed according to the invention for grinding the tread surface of a raw tire casing in the area of the tread splice to make it more uniform;

Fig. 2 is an elevational view of the machine;

Fig. 3 is a view on a larger scale of a portion of the machine for supporting a raw tire casing from which it is desired to remove irregularities in accordance with the invention, showing a portion of a raw tire casing in place, and taken in section along the line 3—3 of Fig. 1;

Fig. 4 is a fragmentary elevational view taken in section along line 4—4 of Fig. 1, and showing on a larger scale certain cams and limit switches for controlling the operation of the machine;

Fig. 5 is an elevational view taken in section along the line 5—5 of Fig. 1, and showing the grinding mechanism in engagement with a tire casing mounted in the machine;

Fig. 6 is a fragmentary enlarged elevational view of a portion of the tire casing supporting means, taken along the line 6—6 of Fig. 1.

Fig. 8 is a more detailed enlarged plan view of one of the limit switch mechanisms for controlling the operation of the machine;

Figs. 9 to 11 are side elevational views of the switch of Fig. 7, showing alternate operating positions thereof;

Figs. 12 to 19 are largely diagrammatic elevational views showing the relationship between the grinding mechanism and the mechanism supporting the tire casing at successive stages in the operation of the machine;

Figure 7:
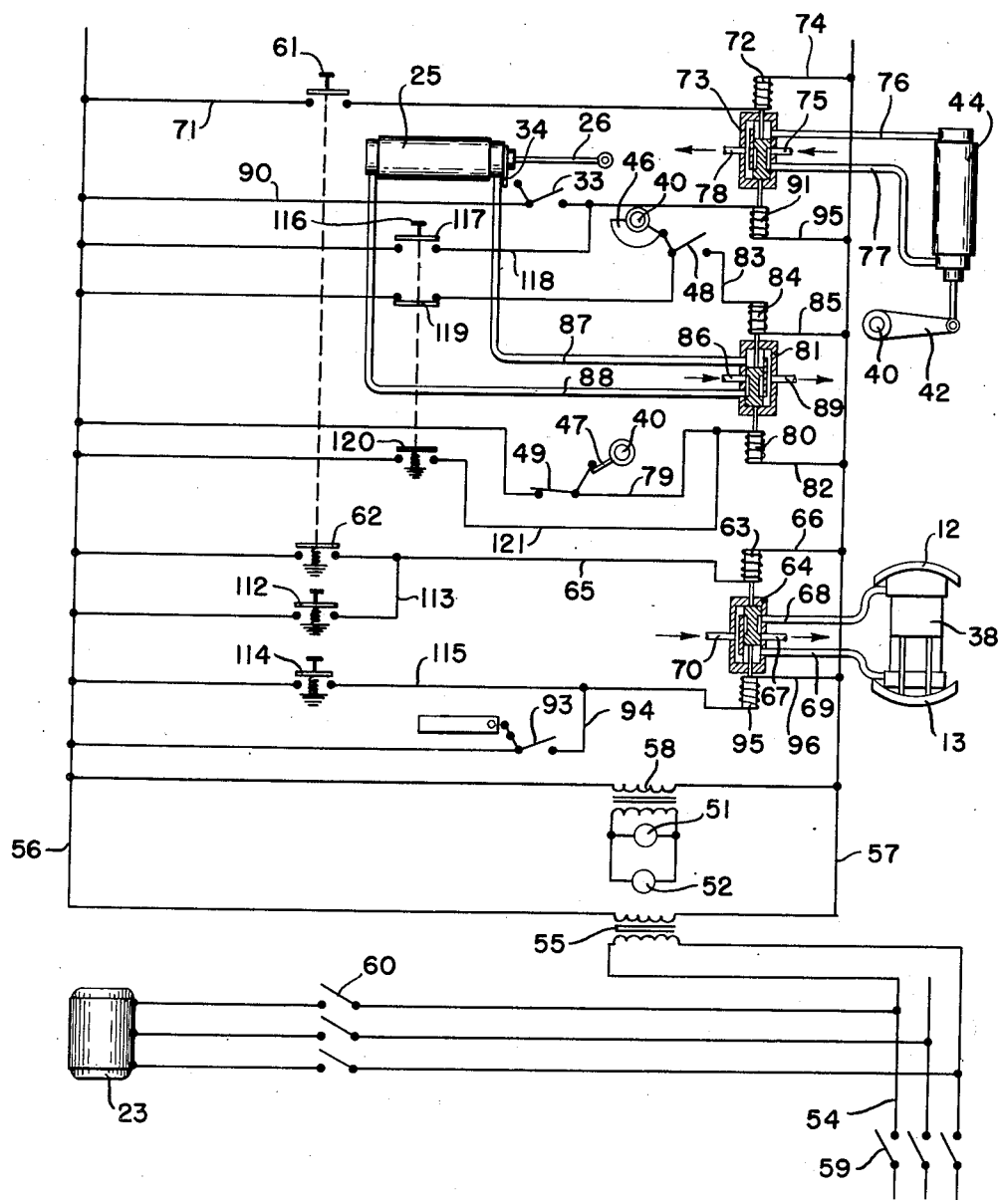
Fig. 7 is an elementary diagram showing schematically the control system for the machine.

The invention provides for production of a pneumatic tire casing having substantially uniform deflection characteristics by removing material from the tread at the area of the tread splice, while the tire is in a raw, unvulcanized state. It has been found possible, by removing material in this manner, to produce tires which are relatively free from thump. In carrying out the invention, the raw tire tread is initially formed by extruding vulcanizable rubber stock at an elevated temperature through a shaping die having the contour of the desired tread profile, and the thus-shaped tread, after cooling, is cut into definite lengths corresponding to the circumference of the desired tire. The tread is then applied to a raw tire carcass composed of rubberized fabric and previously prepared in the form of an annular band on a tire building drum. The ends of the tread which are usually suitably skived, are overlapped on the carcass to form the tread splice.

As a result of the handling of the tread, and as a result of the non-uniform shrinkage forces to which the tread is subjected between the time it is extruded and the time it is applied to the carcass, there is usually an excess of material present where the ends of the tread are spliced together. There may also be excess material present due to the fact that the ends of the tread are overlapped too much in making the splice, or due to the fact that the operator may pull the end of the tread somewhat in making the splice, thereby producing a relative thinning out of the tread in the area away from the splice. It has been found possible to substantially counteract these undesirable effects, and thereby reduce thumping, by removing definite quantities of material from the area of the tread splice in accordance with the invention. When a slight excess of material is removed from the tread at the area of the splice it is found that the finished tire has relatively uniform deflection characteristics throughout its circumference.

It has been found preferable to remove the excess material at the area of the tread splice by grinding the surface of the tread at this area. Most preferably, the tread surface at the area of the splice is ground to a definite profile, by means of a grinding wheel of suitable contour, such definite profile corresponding to the normal profile of the tread at the area away from the splice.

Referring to the drawings, the embodiment of the invention shown therein includes a suitably contoured grinding wheel 10 for grinding the tread surface of a tire casing 11 to a definite profile at the area of the splice while the casing 11 is supported on an arrangement of arcuate supporting segments 12 and 13 constituting a form of collapsible supporting drum having its axis parallel to the axis of the grinding wheel. For the purpose of bringing the grinding wheel 10 into and out of engagement with the surface of the casing 11 to be worked on, the grinding wheel 10 is supported from a framework including two spaced upright channel members 14 and 15 that are secured at their lower ends to a horizontally disposed shaft 16 mounted for rotation in pillow blocks 17 fixed to the base 18 of the machine. Bearing blocks 19 and 20 secured to the sides of the channel members 14 and 15, respectively, toward the upper end thereof, rotatably support the horizontal shaft 21 which carries the grinding wheel 10 at one end, and which is driven at the other end by driving belts 22 passing from a driving motor 23 mounted on a supporting member 24 attached to the channels 14, 15. The arrangement is such that as the channels 14, 15 are pivoted with the shaft 16 to move the grinding wheel 10 toward or away from the work 11, the entire assembly, including the driving motor 23, driving belts 22 and drive shaft 21, also moves as a unit with the supporting channels.

The desired tilting of the grinding wheel unit is accomplished with the aid of a generally horizontally disposed pneumatic cylinder 25 supported in the upper framework of the machine. A piston rod 26 extending from one end of the cylinder 25 is pivotally secured to a bracket 27 attached to a horizontal cross piece 28 extending from one of the upright supporting channels 14 to the other channel 15. At its other end, the cylinder 25 is pivotally secured to a rod 29 that is threaded through a rotating collar 30 mounted within a supporting block 31 in the upper framework of the machine. A hand wheel 32 permits rotation of the collar 30 for the purpose of making horizontal adjustment in the position of the threaded rod 29, and hence of the cylinder 25, to aid in accurately locating the grinding wheel 10 with respect to the work 11. The arrangement is such that as the piston rod 26 is withdrawn into the cylinder 25 by appropriate application of pneumatic pressure, the entire grinding wheel assembly is drawn toward the work. As the grinding wheel arrives at its proper operating position, a limit switch 33 secured in the upper framework of the grinder assembly contacts a projecting arm 34 located at the forward end of the cylinder 25, thereby causing, through a control system which will be described below, the actuation of a mechanism for rotating the tire casing 11 and the supporting drum segments 12, 13 with respect to the grinding wheel 10.

A suitable hood 35 largely surrounds the grinding wheel 10 and serves to direct dust and particles abraded from the surface of the casing 11 into a collecting bin 36 provided for this purpose.

The arcuate supporting segments 12 and 13, on which the casing 11 to be worked on is disposed, have curved outer faces of somewhat lesser curvature than the inner curvature of the row tire casing 11 when in the form of an annular band after removal from the tire building drum. The supporting segments 12 and 13 are spaced diametrically from each other at a distance somewhat less than the diameter of the bead wires of the tire casing so that the casing may easily be placed thereover. Provision is made for expanding the supporting segments 12, 13 relative to each other diametrically after the casing 11 is placed thereon to press the segments firmly against the inner surface of the casing, so that the casing is firmly held in place upon the supporting segments during the grinding operation. For this purpose, the underside of the upper segment 12 carries a pneumatic cylinder 38 from which supporting piston rods 39, carrying the remaining segment 13, extend. Introduction of air into the upper-end of the cylinder 38 causes the piston rods 39 to move outwardly, thereby moving the segment 13 diametrically away from the segment 12, and diametrically expanding the casing 11 into the generally oval distorted form shown in Fig. 5, in which position the casing is maintained firmly on the surfaces of the supporting segments.

For the purpose of rotating the tire casing 11 during the grinding operation, the cylinder 38 is mounted on a horizontal shaft 40 rotatably supported in bearing blocks 41 within the framework of the machine. The shaft 40 is parallel to the axis of the grinding wheel 10. The upper supporting segment 12, on which the casing 11 is positioned with the splice 37 approximately at its center, is most preferably mounted slightly eccentrically with respect to the center of rotation of the shaft 40. Specifically, the center of curvature of the segment 12 is preferably disposed a small distance radially outwardly from the center of rotation of the shaft 40 in a plane passing through the splice 37 and the center of the shaft 40. Such eccentricity is designated by the letter "A" in Fig. 6, and results in a predetermined variation in the distance between the axis of the grinding wheel 10 and the surface of the casing 11 as the supporting segment 12 rotates with the shaft 40. The arrangement is such that the surface of the grinding wheel 10 will in effect give a varying depth of cut as the supporting segment 12 and the casing 11 move in a curved path past the grinding wheel. The depth of cut varies from zero when the grinding wheel 10 is near one end of the supporting segment 12, to a maximum at the splice 37, which is approximately at the center of the segment 12, and to zero again when the grinding wheel 10 is at the other end of the segment 12.

To rotate the shaft 40, an arm 42 fixed to the shaft extends downwardly therefrom, and is pivotally attached to a piston rod 43 extending from an operating cylinder 44 that is in turn pivotally attached at its lower end to the base 18 of the machine. Introduction of air into the lower end of the cylinder 44 causes the piston rod 43 to move outwardly from the cylinder, thereby rotating the shaft 40 through the connecting arm 42, and rotating the supporting segments 12, 13 and connecting cylinder 38 as a unit. The arrangement is such that the cylinder 44 rotates the shaft 40 through an arc of approximately 120°. The shaft 40 is also provided with a cam 46 and a radially extending arm 47, which serve to actuate limit switches 48 and 49, respectively, attached to the framework of the machine, to control the operation of the machine in a manner that will be described in more detail below.

Figure 20:
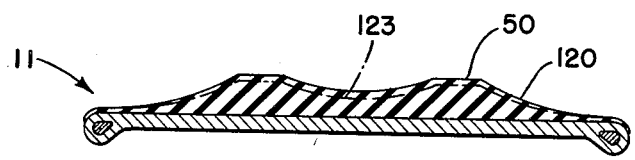
Fig. 20 is a diagrammatic sectional view of a raw tire casing at the area of the tread splice, showing the profile of the tread.

As best seen in Fig. 20, the grinding wheel 10 has a surface contour corresponding to the profile of the tire tread surface, and it is of such axial length as to extend somewhat beyond each side of the two symmetrically disposed elevated or projecting portions 50 of the tread corresponding to the shoulders of the tire.

In order for the grinding operation to properly shape the tread surface to the desired profile, it is essential that the tread be accurately centered with respect to the grinding wheel. For this purpose, there are provided two spaced light sources 51 and 52 mounted on the upper framework 53 of the machine, which direct relatively fine beams of light onto the center line of the upper supporting segment 12, which line is in alignment with the center line of the grinding wheel. When the casing 11 is placed on the supporting segment 12 in such a position that the light beams impinge on the center line of the tread, then the tread is properly centered with relation to the grinding wheel 10. To aid the operator in observing the center line of the tread, it is convenient to provide a very slight projection or depression on the center line of the die orifice (not shown) in which the tread is initially formed, thereby producing a visible line longitudinally along the center of the tread.

The controlling system for the machine will now be described with particular reference to Fig. 7. Main power supply lines 54 supply a three-phase voltage to the grinder motor 23 and, through a suitable transformer 55, supply a lower voltage to two principal lines 56, 57 of the controlling system. An additional transformer 58 connected across the lines 56, 57 supplies current at a reduced potential to the centering lights 51, 52. The main power supply may be turned on and off by means of a switch 59, and the grinder motor may be turned on and off by a suitable switch 60.

The controlling system is shown in Fig. 7 in the condition which exists before the start of a cycle of operation. The various solenoid controlled valves shown therein are so constructed that they remain in the position last energized, while the various limit switches are of the normally open type. To initiate an operating cycle, the operator depresses a manual start push button 61, closing contacts 62 and causing a voltage to be applied to a solenoid 63 of a drum-expanding pneumatic control valve 64, through conductors 65 and 66 connected to the lines 56 and 57 respectively. When the solenoid 63 is energized in this manner a supply line 70 leading into the valve 64 is placed in communication with a pneumatic line 68 leading to the upper portion of the drum-expanding cylinder 38, and at the same time a pneumatic line 69 leading from the lower portion of the cylinder 38 is placed in communication with an exhaust port 67 of the valve 64. This causes the cylinder 38 to move the lower supporting segment 13 diametrically away from the upper supporting segment 12, thereby expanding the supporting drum and firmly binding the casing 11 to the supporting segments, as indicated previously.

When the start button 61 is depressed, a circuit is also established from conductor 56 through a conductor 71 into a solenoid 72 of a drum-rotating pneumatic control valve 73 and through a conductor 74 into the line 57. This places a pneumatic supply line 75 leading into the valve 73 into communication with a pneumatic line 76 leading into the lower end of the drum-rotating cylinder 44 and at the same time a pneumatic line 77 leading from the upper end of the cylinder is placed in communication with an exhaust port 78 on the valve 73. This causes the piston rod 43 to move upwardly from the cylinder 44, thereby producing reverse or counter-clockwise rotation, as viewed in Fig. 2, of the shaft 40 and the attached supporting drum segments 12, 13 carrying the casing 11, as a unit. As the shaft 40 begins to rotate the arm 47 projecting from the shaft leaves the limit switch 49, thereby permitting this switch to open and breaking a circuit through conductor 79, solenoid 80 of a grinder-tilting pneumatic control valve 81 and conductor 82.

The eccentricity of the cam 46 carried by the shaft 40 is such that after the shaft 40 has rotated in the reverse or counter-clockwise direction for a short distance, e. g., 5-10°, the cam 46 closes the limit switch 48. Closing of switch 48 establishes a circuit from the line 56 through a conductor 83 and through a solenoid 84 of the grinder-tilting valve 81, and thence through a conductor 85 to the line 57. Energizing of the solenoid 84 causes the valve 81 to take up a position such that a pneumatic supply line 86 leading into the valve is placed in communication with a pneumatic line 87 leading to the forward end of the grinder-tilting cylinder 25, while a line 88 leading from the other end of the cylinder 25 is placed in communication with an exhaust port 89 from the valve. This causes the piston rod 26 to be drawn into the cylinder 25, thereby tilting the grinder assembly forward into operating position in engagement with the surface of the casing 11 as indicated in Fig. 5.

The relative speeds of the reverse rotation of the shaft 40 and the forward tilting of the grinder assembly are such that the drum has completed its reverse rotation as the grinder arrives in operating relationship with the drum. By causing the grinder assembly to begin its forward tilting while the drum is reversely rotating, the total time required for a complete operating cycle is appreciably shortened.

As the grinder assembly tilts into its operating position the projection 34 on the front of the grinder-tilting cylinder 25 engages and closes the limit switch 33 thereby establishing a circuit from line 56 through a conductor 90 and a solenoid 91 of the drum-rotating pneumatic control valve 73, and thence through a conductor 92 into line 57. When the solenoid 91 is energized the valve 73 takes up a position such that the pneumatic supply line 75 is in communication with the pneumatic line 77 leading to the top of the cylinder, while the pneumatic line 76 from the bottom of the cylinder is in communication with the exhaust port 78 of the valve. This causes the drum shaft 40 to be rotated in its forward, or clockwise direction as viewed in Figs. 2 and 5, thereby rotating the casing 11 across the face of the grinding wheel in such manner that the outer surface of the circumferential section of the casing supported on the supporting drum segment 12 progressively engages the grinding wheel 10 from a point circumferentially spaced to one side of the splice 37 to a point circumferentially spaced toward the other side of the splice.

Shortly before the shaft 40 completes its forward or clockwise rotation, e. g., 5–10° before completion, the cam 46 releases the limit switch 48 so that the solenoid 80 of the grinder-tilting valve 81 is deenergized. As the shaft 40 completes its forward rotation, the arm 47 thereon contacts and closes the limit switch 49 thereby once again energizing the solenoid 80 of the valve 81 and causing the grinder-tilting cylinder 25 to return the grinder assembly to the vertical position.

There is also provided a limit switch 93 mounted on the fixed framework of the machine and so arranged that as the grinder assembly is tilted back to its original position, the limit switch 93 is momentarily actuated, for the purpose of contracting the supporting segment 13 of the tire casing supporting drum, so that the drum is collapsed and the casing may be removed therefrom. The closure of the switch 93 establishes a circuit from the line 56 through a conductor 94 into a solenoid 95 of the pneumatic control valve 64, and through an additional conductor 96 into the line 57. When the solenoid 95 is energized the control valve is so positioned that the air exhausts from the top of the drum expanding cylinder 38 through the line 69 and out exhaust port 70, while air pressure is applied to the opposite end of the drum cylinder 38 from the supply line 67 through line 68.

The manner in which the limit switch 93 is momentarily actuated as the grinder assembly tilts back to its original position will best be understood from a consideration of Figs. 7 to 10. The assembly 93 includes a switch housing 97 from which a pivotal arm 98 that actuates the switch extends. A cam 99 is pivotally mounted between two arms of a fork 100 formed in a plate 101 attached to one side of the switch housing 97 in such manner that the cam 99 contacts a roller 102 at the extremity of the switch arm 98. An arm 103 extending from the cam 99 carries on its extremity a roller 104 which is adapted to contact a pin 105 fixed to an arm 106 (Fig. 1) rigidly attached to the framework of the grinder assembly. For the purpose of normally maintaining the cam 99 in the position indicated in Fig. 8, a tension spring 107 is mounted at one side of the plate 101 and is fixed to the plate at one end, while the other end of the spring is secured in a block 108 that is rigidly attached to a pivotal shaft 109 which passes rotatably through the arms of the fork 100, and which is rigidly secured to the cam 99 for rotation therewith. The cam 99 is provided with a relatively low portion 110 which is so designed that as the roller 104 on the cam arm 103 contacts the pin 105 as the grinder assembly tilts forward, the switch arm 98 is tilted only partially, and insufficiently to actuate the switch, as indicated in Fig. 9. After the pin 105 passes the roller 104 the spring 107 returns the cam 99 to the neutral position as indicated in Fig. 8. When the grinder assembly is tilted in the reverse direction the roller 104 contacts the pin 105 to move the cam 99 in an opposite sense, thereby bringing a high portion 111 of the cam into contact with the roller 102 on the end of the switch arm 98 and thereby tilting the switch sufficiently to actuate it, as indicated in Fig. 10. After the pin 105 passes the roller 104 in this direction the spring 107 again returns the cam 99 to its neutral position as indicated in Fig. 8, thereby permitting the switch arm 98 to release the switch again.

As the grinder assembly begins to return to the vertical position the limit switch 33 is also released, deenergizing the solenoid 91 of the drum-rotating control valve 73, so that the control system is once again in the condition indicated in Fig. 6, and is ready for the start of another cycle, after the casing 11 is removed from the supporting drum and another casing to be ground is substituted therefor.

The control system includes provision for manually opening or closing the supporting drum, in the form of a manual drum expanding push button 112 which is capable of establishing a circuit through the solenoid 63 of the drum-cylinder valve 64 through a conductor 113 leading from the line 56 to the conductor 65 in parallel with the starting contacts 62. Similarly the drum may be manually collapsed by actuating a push button 114 which establishes a circuit through the remaining solenoid 95 of the drum cylinder valve 64 through a conductor 115 parallel to the limit switch 93 and leading from the line 56 to the conductor 94.

Provision is also made in the control circuit for manually returning the grinder assembly from its operating position to its vertical position. This is accomplished by means of a push button 116 that serves to establish a circuit across contacts 117 in a conductor 118 that by-passes the limit switch 33 from the line 56 to the conductor 90 leading to the solenoid 91 of the drum-rotating valve 73, thereby causing the drum to be rotated in a reverse direction. At the same time the push button 116 opens normally closed contacts 119 in the line 83 and simultaneously closes contacts 120 in a conductor 121 that by-passes the limit switch 49, which controls the solenoid 80 of the grinder-tilting cylinder valve 81 in such manner that the grinder is tilted back to its vertical position.

The sequence of operation of the machine will now be reviewed with particular reference to Figs. 12 to 19. Initially, the drum segments 12, 13 are in the collapsed position, and the wheel 10 of the grinder unit is in the vertical position, as indicated in Fig. 12. The raw tire casing 11 in the form of a generally flat annular band, as removed from the tire building drum (not shown), is placed on the supporting segment 12 with the tread splice 37 approximately on an axial center line of the segment, and with the circumferential center line of the tread in accurate alignment with the circumferential center line of the supporting drum and grinding wheel. Such circumferential centering is effected with the aid of the two centering lights 51, 52, as indicated previously.

With the grinder motor 23 running, the start button 61 is depressed manually, causing the drum-expanding solenoid 63 to actuate the valve 64 and expand the supporting drum by the action of the pneumatic cylinder 38. This is indicated in Fig. 13. At the same time the drum-rotating solenoid 72 is energized causing the cylinder 44 to rotate the shaft 40 in the reverse direction, as indicated in Fig. 14.

Shortly after the reverse rotation of the drum begins, the limit switch 48 is closed by the cam 46 on the shaft 40, causing the grinder-tilting solenoid 84 of the valve 81 to be energized, thereby moving the grinding wheel 10 forward, so that it arrives in engagement with the tire casing 11, as indicated in Fig. 15, as the drum completes its reverse rotation.

Figure 21:
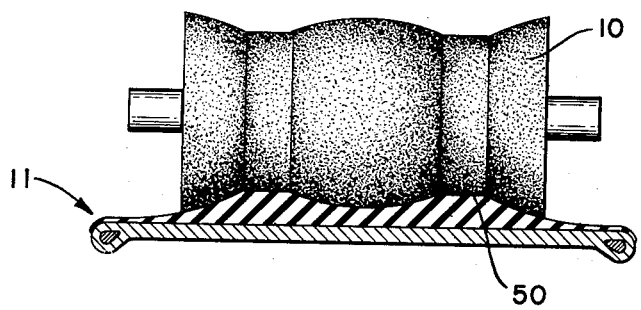
Fig. 21 is a similar view showing the spliced area in contact with a grinding wheel.
Figure 22:
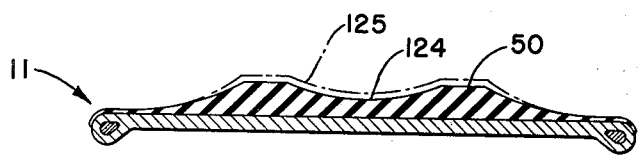
Fig. 22 is a similar view of the tread after grinding the splice.

As the grinder takes up its operating position, limit switch 33 is tripped by the projection 34 on the tilting cylinder 25, thereby energizing the drum-rotating solenoid 91, and causing the drum-rotating cylinder 44 to rotate the drum shaft 40 in a clockwise direction, as shown in Fig. 16. The supporting drum is rotated on an axis that is parallel to the axis of the supported tire casing 11, so that the grinding wheel 10 grinds off the surface of the tread to the desired profile, as determined by the face contour of the grinding wheel. Thus, referring to Fig. 20, the tread of the casing 11 will typically have at the location of the tread splice a contour or profile 120 which is relatively elevated with respect to the normal profile 123 of the remainder of the tread, as indicated by the dotted line in Fig. 20. When the grinding wheel 10 of proper contour, corresponding to the contour 123 of the normal tread profile, is rotated against the supported tire casing 11 in the manner shown in Fig. 21, the excess material is removed from the tread at the area of the splice. As a result the tread acquires at the splice a contour 124, as indicated in Fig. 22 which corresponds to the normal tread profile, and is lighter than the original tread profile 125 at this area. The grinding wheel 10 is applied in this manner over a circumferential distance at each side of the splice.

When the grinding wheel has passed over and beyond the splice, as indicated in Figs. 16 and 17, the limit switch 49 is actuated, energizing the grinder-tilting solenoid 80, and causing the grinder to be tilted back by the action of the tilting cylinder 25 to the position indicated in Fig. 18. As the grinder tilts back the limit switch 93 causing collapse of the supporting drum is momentarily actuated, so that the drug segment 13 is drawn inwardly as indicated in Fig. 19 and the tire casing 11 may be removed for subsequent shaping and curing operations.

In accordance with the preferred practice of the invention, the axis of the supported tire casing is slightly eccentric with respect to the center of rotation of the supporting drum as represented by distance "A" in Fig. 6, so that the surface of the tread gradually approaches closer to the axis of the grinding wheel as the wheel approaches the splice, and thereafter the surface of the tread again gradually recedes with respect to the grinding wheel. In this way, the grinding wheel removes a maximum of material from the tread at the splice, and progressively less material at points farther removed from the splice, toward either side thereof. The broken line at the edge of the tread surface in Fig. 6 indicates the original level of the tread before grinding, and shows how the grinding action is gradually tapered toward either side of the splice 37.

It has been observed in actual practice of the invention that pneumatic tires made as described have substantially more uniform deflection characteristics, and therefore are relatively free from vibration or "thump," compared to tires made by conventional methods. By removing excess material from the area of the tread splice as described the deflection of the finished tire at such area is made substantially more like the deflection at other points around the circumference of the tire. This improvement is observable not only in the form of decreased tendency to thumping, but can also be observed directly by measuring the deflection of the tire at various points along the circumference thereof, conveniently with the aid of a deflection recording apparatus of the type described in the copending application Serial No. 247,326, filed September 19, 1951, of Karsai, and assigned to the same assignee as the instant application. With such an apparatus it is readily observable that the tires made by the present method have greatly improved deflection uniformity compared to conventionally made tires.

In the embodiment of the invention described in detail above, the excess material was removed from the tread splice area by grinding such area to essentially the same profile as the remainder of the tread. Such profile grinding is made possible in a convenient manner particularly because of the centering means provided in the apparatus, since it is of course necessary to be able to quickly and accurately center the tire casing with respect to the contoured grinding wheel, and to maintain such centering throughout the grinding operation, if the desired uniform profile is to be obtained.

Figure 23:
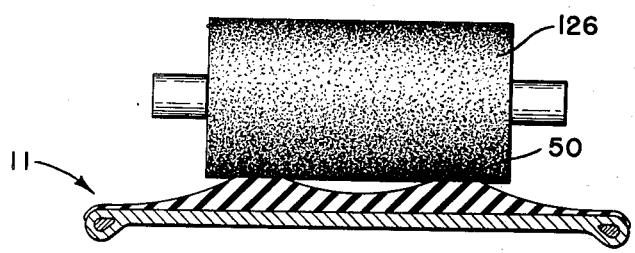
Figs. 23 and 24 are similar views indicating a modification of the invention.
Figure 24:
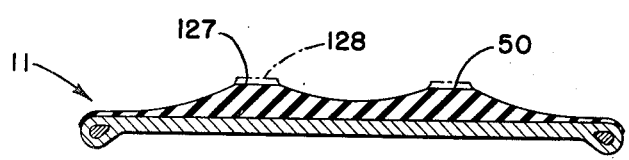

While such profile grinding represents the preferred form of the invention, it is also possible to realize the advantages of the invention to a considerable extent by removing excess material from selected portions of the tread splice area. Thus, in the modification of the invention shown in Figs. 22 and 23, a grinding wheel 126 having a flat profile, that is, a constant diameter, is applied to the tread splice area. Such a grinding wheel contacts only the relatively elevated or raised portions 50 of the tread, which correspond to the shoulder areas of the finished tire, without contacting the lower portions of the tread between the shoulders and at the sides of the shoulders. After such a grinding operation the tread has a profile 127 indicated in Fig. 23, in which the shoulders 50 are relatively lower compared to their original height before grinding, as indicated by the dotted lines 128. Removal of excess material from the tread splice at the shoulders in this manner also improves the uniformity of the deflection of the tire.

Figure 25:
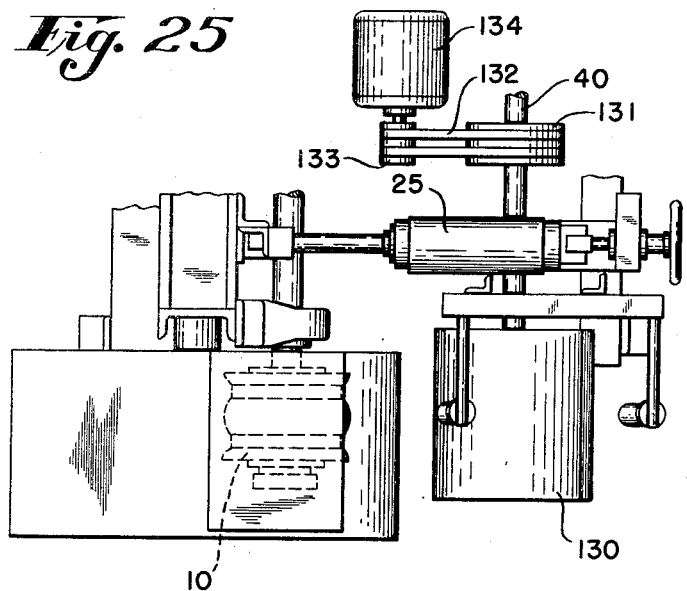
Fig. 25 is a fragmentary plan view of a modified form of tread grinding apparatus constructed according to the invention.
Figures 26, 27:
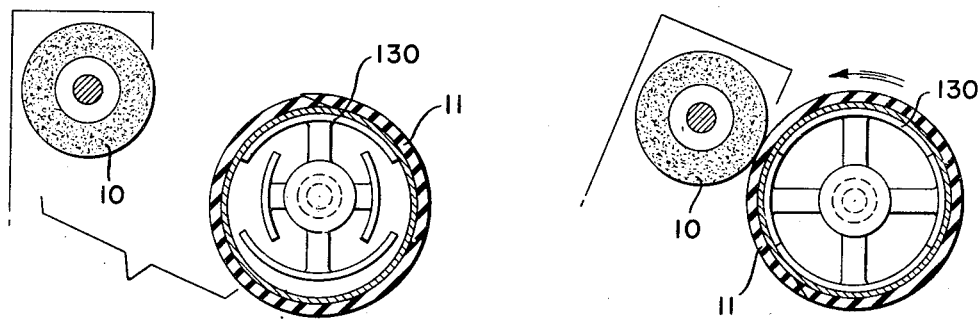
Figs. 26 and 27 are fragmentary elevational views of the apparatus of Fig. 25, with a tire casing in place therein, showing a modified supporting drum in a collapsed and expanded position, and out of and into engagement with a grinding wheel, respectively.

Still another modification of the invention contemplates grinding the tread to a definite profile throughout its circumference. In this case the tire casing is supported on a supporting drum forming a complete circle and the drum and casing are rotated concentrically during the grinding. Referring to Figs. 25 to 27, a suitable form of apparatus for carrying out this method includes a supporting drum 130 that is constructed similarly to the usual collapsible tire building drum, that is, it can be expanded to circular shape as shown in Fig. 27, or collapsed to a smaller diameter as shown in Fig. 26 to permit placing a tire casing 11 on the drum or to permit removal of the casing. The rotatable shaft 49 on which the drum is concentrically mounted has a driving pulley 131 connected by driving belts 132 to a pulley 133 of a suitable motor 134 so that the drum 130 may be rotated at least one complete revolution during the profile grinding. The operation of this modification involves placing the casing 11 to be ground on the drum 130 in the collapsed form as shown in Fig. 26, and then expanding the drum, as shown in Fig. 27. Preferably the drum has a slightly greater diameter in the expanded position than the drum on which the casing was originally built, in order that the casing will fit against the surface of the drum with great firmness. This also produces a definite circumferential stretching or expansion of the carcass, which aids in removing any non-uniformities which might have been built into the carcass. The assembly bearing the rotating grinder wheel 10 is then tilted into operative engagement with the mounted casing 11, by actuation of the cylinder 25 as described above, and as indicated in Fig. 27, while simultaneously rotating the drum 130 by means of the motor 134. The arrangement is such that there is a definite spacing maintained between the surface of the drum and the surface of the grinding wheel during the grinding, so that a definite profile is produced throughout the circumference of the casing. After the grinding wheel has contacted the casing for at least one complete revolution, the grinder assembly is then tilted away from the casing 11, the drum 130 is collapsed, and the finished casing is removed.

It has been found in practice that the foregoing modification of the invention results in the most uniform tires, that are free from irregularities, and display most uniform deflection throughout their circumference.

Having thus described our invention, what we claim and desire to protect by Letters Patent is:

1. A method of making pneumatic tires comprising in combination the steps of forming a rubber tread of definite profile and length, applying said tread to an annular carcass on which the ends of said tread are spliced to form an annulus, reducing the bulk of the said spliced tread at the area of said splice by removing sufficient rubber from the area of said splice to render the deflection characteristics of the finished tire substantially uniform throughout the circumference of the tire, and curing the resulting assembly in final tire shape.

2. A method of making pneumatic tires comprising in combination the steps of forming a rubber tread of definite length and with a profile having elevated areas corresponding to the shoulders of the finished tire, applying said tread to an annular carcass on which the ends of said tread are spliced to form an annulus, removing material from the surfaces of the said elevated shoulder areas at the area of the said splice to render the deflection characteristics of the finished tire substantially uniform throughout the circumference of the tire, and subsequently curing the assembly in final tire shape.

3. A method of making pneumatic tires comprising in combination the steps of forming a rubber tread of definite profile and length, applying said tread to an annular carcass on which the ends of said tread are spliced to form an annulus, removing material from the surface of said tread at the area of said splice to produce a profile at the said area similar to the profile of the remainder of the tread to render the deflection characteristics of the finished tire substantially uniform throughout the circumference of the tire, and subsequently curing the resulting assembly in final tire shape.

4. A method of making pneumatic tires comprising in combination the steps of forming a rubber tread of definite profile and length, applying said tread to an annular carcass on which the ends of said tread are spliced to form an annulus, grinding the surface of said tread at the area of said splice to produce a profile at said area similar to the profile of the remainder of the tread, and subsequently curing the resulting assembly in final tire shape.

5. A method of making pneumatic tires comprising in combination the steps of forming a rubber tread of definite profile and length, applying said tread to an annular carcass on which the ends of said tread are spliced to form an annulus, extending the resulting annular assembly along a diameter thereof with the said spliced area located in the area of the diametric line of expansion, bringing the thus extended assembly into contact with a rotatable grinding wheel having a profile corresponding to the profile of said tread, and rotating the tire assembly on a slightly larger radius than the radius of the annular assembly in contact with said grinding wheel, for a definite circumferential distance at each side of the said splice, to produce at the area of said splice a definite profile and radius in the tread, and subsequently curing the assembly in final tire shape.

6. A method of making pneumatic tires comprising in combination the steps of forming a rubber tread of definite length and with a profile having two symmetrically disposed spaced elevated areas corresponding to the shoulders of the finished tire, applying said tread to an annular carcass on which the ends of said tread are spliced to form an annulus, supporting the resulting casing assembly on an arcuate surface with the area of the casing at the said splice disposed in a curve having a radius less than the normal inside radius of the casing, bringing the tread surface into contact with a grinding wheel having a surface contour corresponding to the normal profile of the tread and extending from the outer side of one of said shoulder elevations to the outer side of the other of said shoulder elevations, rotating the said grinding wheel, rotating the said arcuate supporting surface eccentric to its center so as to contact the said tread with the rotating grinding wheel along a curved path having a radius slightly greater than the radius of the casing supported on the arcuate surface, the contact between the tread surface and the grinding wheel being maintained for an area extending circumferentially at each side of said splice, so as to grind off excess material at said area, and subsequently curing the casing in final tire shape.

7. A method of making pneumatic tires comprising in combination the steps of forming a rubber tread of definite profile and length, applying said tread to an annular carcass on which the ends of the tread are spliced to form an annulus, removing material from the surface of said tread at the area of splice by grinding the surface at said area, said grinding removing a maximum of material at the line of splice and progressively less material at each side of the line of splice, the amount of material removed tapering gradually to zero at equally spaced points at each side of the line of splice, and subsequently curing the resulting assembly in final tire shape, whereby the deflection characteristics of the finished tire are rendered substantially uniform.

8. A method of making pneumatic tires comprising in combination the steps of forming a rubber tread of definite profile and length, forming a longitudinal centering line on the surface of said tread, applying said tread to an annular carcass on which the ends of said tread are spliced to form an annulus, providing an annular supporting surface for the resulting assembly, directing two spaced longitudinally aligned, relatively fine, beams of light onto the said supporting surface, placing the assembly on the supporting surface with the said longitudinal centering line on the surface of the tread in coincidence with the two said spaced longitudinally aligned beams of light, providing a grinding wheel in centered alignment with said supporting surface, said grinding wheel having a contoured face corresponding to a desired contour of the tread surface, and rotating the grinding wheel in contact with the tread surface to remove excess material therefrom and produce a definite profile on the tread surface, and subsequently curing the resulting assembly in final tire shape.

9. A method of making pneumatic tires comprising in combination the steps of forming a rubber tread of definite profile and length, applying said tread to an annular carcass on which the ends of the tread are spliced to form an annulus, supporting said annulus on a circular drum, bringing said tread into contact with a grinding wheel having a profiled face corresponding to a desired profile in the tire tread, and rotating the grinding wheel while progressively contacting the entire circumference of the tread with the grinding wheel, and subsequently curing the resulting casing in final tire shape.

10. A method of making pneumatic tires comprising in combination the steps of forming a rubber tread of definite profile and length, applying said tread to an annular carcass on which the ends of the tread are spliced to form an annular tire casing, supporting said tire casing on a circular drum, rotating the drum and casing concentrically for at least one complete revolution in contact with a rotating grinding wheel having a profile corresponding to a desired contour of the tread surface thereby removing material from the tread surface to render the deflection characteristics of the final tire substantially uniform, and subsequently curing the casing in final tire shape.

11. An apparatus for improving the uniformity of tire treads comprising in combination a grinding wheel, a drum for supporting a tire casing in longitudinally curved form, the axis of the grinding wheel and the axis of the drum being in parallel relation, means for producing relative movement of said grinding wheel and said drum to bring said grinding wheel into and out of operative engagement with the said tread surface of said tire casing mounted on said drum and means for producing relative longitudinal movement of the axis of the grinding wheel and the surface of said longitudinally curved tread so that the point of engagement of the grinding wheel with the longitudinally curved tread during said relative movement describes a longitudinally curved path having a center of curvature which is slightly eccentric with the center of curvature of said longitudinally curved tread to thereby grind the said tread surface supported in curved form on the said drum to a definite radius.

12. An apparatus for improving the uniformity of tire treads, comprising in combination a grinding wheel, a drum for supporting a tire casing, a pair of spaced light sources directing light beams onto spaced points on a circumferential line of the drum to guide positioning of a casing thereon, means for producing relative movement of said grinding wheel and said drum to bring said grinding wheel into and out of operative engagement with a tread surface of a tire casing mounted on said drum, and means for rotating said drum when said grinding wheel is in operative engagement with a tread surface to contact a definite segment of said tread surface with said grinding wheel, thereby grinding said surface to a definite radius.

13. An apparatus for improving the uniformity of tire treads, comprising in combination a generally cylindrical grinding wheel having a surface contour corresponding to a tread profile desired in a tire casing, a drum for supporting said tire casing, light sources directing beams of light onto the surface of said drum at spaced points along a circumferential line corresponding to a circumferential center line of said grinding wheel, means for producing relative movement of said grinding wheel and said drum to bring said grinding wheel into and out of operative engagement with a tread surface of a tire casing mounted on said drum, and means for rotating said drum when said grinding wheel is in operative engagement with a tread surface to contact a definite segment of said tread surface with said grinding wheel, thereby grinding said surface to a definite radius.

14. An apparatus for improving the uniformity of tire treads comprising in combination a pair of curved drum segments constituting a supporting means spaced apart by a distance less than the diameter of a tire casing to be supported thereon, means for moving said drum segments diametrically outwardly with respect to each other to expand said segments against the interior surface of a tire casing placed thereon to maintain such casing firmly in place, a pair of spaced light sources for directing light beams onto spaced points on a circumferential centering line of one of said drum segments to indicate centering of a tire casing on said segment, a generally cylindrical grinding wheel having a surface contour corresponding to a tread profile desired in a supported tire casing, a supporting means for said grinding wheel, a pivotal mounting for said supporting means, a means for moving said supporting means about said pivotal mounting to position said grinding wheel at a definite operating location with respect to a casing supported on said drum segments, and a rotatable shaft for rotating said supporting segments and a supporting casing as a unit in operative engagement with said grinding wheel.

15. An apparatus for improving the uniformity of tire treads comprising in combination a grinding wheel, a drum for supporting a tire casing, means for expanding and collapsing said drum, means for moving said grinding wheel relative to said drum to bring said grinding wheel into and out of operative engagement with a tread surface of a tire casing mounted on said drum, means for rotating said drum when said grinding wheel is in operative engagement with said tread surface to contact said tread surface with said grinding wheel thereby grinding said surface to a definite radius, control means responsive to the positioning of said grinding wheel in operative position for actuating said drum rotating means, control means responsive to completion of a definite rotation of said drum for actuating said grinding wheel moving means to withdraw said grinding wheel from its operative position, and control means responsive to the withdrawal of the grinding wheel from its operative position for actuating said drum collapsing means to permit removal of a ground tire casing.

16. An apparatus for improving the uniformity of tire treads comprising in combination a pair of cylindrically curved drum segments constituting a supporting means spaced apart by a distance less than the diameter of a tire casing to be supported thereon, means for moving said segments diametrically outwardly with respect to each other to expand said segments against the interior surface of a tire casing placed thereon to maintain such casing firmly in place, means mounting said drum for rotation about an axis eccentric with the axis of curvature of one of said cylindrical segments, means for rotating said drum around said eccentric axis, a generally cylindrical grinding wheel having a surface contour corresponding to a tread profile desired in a supported tire casing, means rotatably supporting said grinding wheel with the axis thereof parallel to the eccentric axis of rotation of said drum, means for effecting relative movement of said drum and said grinding wheel to bring said grinding wheel into engagement with the tread of a tire casing supported on said drum, and means for rotating said grinding wheel.

References Cited in the file of this patent

UNITED STATES PATENTS

| Number | Name | Date |
|---|---|---|
| 2,228,211 | Heintz | Jan. 7, 1941 |
| 2,422,652 | Bacon | June 24, 1947 |
| 2,556,264 | Flynn | June 12, 1951 |